(12) United States Patent
Ornes et al.

(10) Patent No.: US 6,526,168 B1
(45) Date of Patent: Feb. 25, 2003

(54) VISUAL NEURAL CLASSIFIER

(75) Inventors: Chester Ornes, Garden Grove, CA (US); Jack Sklansky, Corona Del Mar, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/272,697

(22) Filed: Mar. 18, 1999

Related U.S. Application Data

(60) Provisional application No. 60/078,771, filed on Mar. 19, 1998.

(51) Int. Cl.$^7$ .............................. G06K 9/62; G06F 15/18
(52) U.S. Cl. .............................. 382/158; 706/20; 706/31
(58) Field of Search .............................. 382/156–158, 382/155, 160; 706/20, 25, 31, 44, 27, 16

(56) References Cited

U.S. PATENT DOCUMENTS

| | | | |
|---|---|---|---|
| 4,906,940 A | 3/1990 | Greene et al. | 382/16 |
| 5,048,100 A | 9/1991 | Kuperstein | 382/36 |
| 5,274,714 A | 12/1993 | Hutcheson et al. | 382/15 |
| 5,276,771 A | 1/1994 | Manukian et al. | 395/24 |
| 5,311,600 A | 5/1994 | Aghajan et al. | 382/14 |
| 5,440,651 A | 8/1995 | Martin | 382/156 |
| 5,500,905 A | 3/1996 | Martin et al. | 382/157 |
| 5,621,863 A | 4/1997 | Boulet et al. | 395/124 |
| 5,631,970 A | 5/1997 | Hsu | 382/113 |
| 5,682,503 A | 10/1997 | Yoda | 395/24 |
| 5,859,925 A | 1/1999 | Yaeger et al. | 382/158 |
| 5,872,861 A | 2/1999 | Makram-Ebeid | 382/130 |
| 5,960,111 A * | 9/1999 | Chen et al. | 382/173 |
| 6,134,537 A * | 10/2000 | Pao et al. | 706/16 |

OTHER PUBLICATIONS

Whittington et al., Applying Visualization Techniques to the Development of Real–World Artificial Neural Networks Applications, SPIE vol. 1709, 1992, pp. 1024–1033.*

Bischof et al., Visualization Methods for Neural Networks, IEEE publication, Pattern Recognition, 1992, vol. II, Conference B, 11$^{th}$ IAPR International Conference on Recognition Methodology and Systems, pp. 581–585.*

Pinz et al., Constructing a Neural Network for the Interpretation of the Species of Trees in Aerial Photographs, IEEE publication, Pattern Recognition, 1990, 10$^{th}$ International Conference on, vol. 1, pp. 755–757.*

Ornes et al., A Visual Multi–Expert Neural Classifier, IEEE publication, Neural Networks, 1997, International Conference on, Jun. 9–12, 1997, vol. 3, pp. 1448–1453.*

Sklansky, Jack and Vriesenga, Mark; "Genetic Selection And Neural Modeling of Piecewise–Linear Classifiers," International Journal of Patten Recognition and Artifical Intelligence, vol. 10, No. 5, pp. 587–612, (1996).

(List continued on next page.)

Primary Examiner—Leo Boudreau
Assistant Examiner—Brian P. Werner
(74) Attorney, Agent, or Firm—John P. O'Banion

(57) ABSTRACT

A neural classifier that allows visualization of the query, the training data and the decision regions in a single two-dimensional display, providing benefits for both the designer and the user. The visual neural classifier is formed from a set of experts and a visualization network. Visualization is accomplished by a funnel-shaped multilayer dimensionality reduction network configured to learn one or more classification tasks. If a single dimensionality reduction network does not provide sufficiently accurate classification results, a group of these dimensionality reduction networks may be arranged in a modular architecture. Among these dimensionality reduction networks, the experts receive the input data and the visualization network combines the decisions of the experts to form the final classification decision.

27 Claims, 5 Drawing Sheets

OTHER PUBLICATIONS

Forrest, A.P.M. and Aitken, R.J.; "Mammography Screening For Breast Cancer," Annual Reviews Medicene, vol. 41, pp. 117–132, (1990).

Jacobs, Robert A. et al.; "Adaptive Mixtures Of Local Experts," Neural Computation 3, pp. 79–87, (1991).

DeMers, D. and Cotrell, G.; "Non–Linear Dimensionality Reduction," Advances in Neural Information Processing Systems, pp. 580–587, (1993).

Cybenko, G.; "Approximation By Superpositions Of A Sigmoidal Function," Mathematics of Control Signals and Systems, pp. 303–314, (1989).

Mao, Jianchang and Jain, Anil K;, "Artifical Neural Networks For Feature Extraction and Multivariate Data Projection," IEEE Transactions on Neural Networks, vol. 6, No. 2, pp. 296–317, Mar. 1995.

Sklansky, Jack et al.; "Locally Trained Piecewise Linear Classifiers," IEEE Transactions on Pattern Analysis and Machine Intelligence, vol. PAMI–2, No. 2, pp. 101–111, Mar., 1980.

Caruana, R.; "Learning Many Related Tasks at the Same Time With Backpropagation," Advances in Neural Information Processing System 7, pp. 657–664, (1995).

Hansen, L.K., and Salamon, P.; "Neural Network Ensembles," IEEE Transactions on Pattern Analysis and Machine Intelligence, vol. 12, No. 10, pp. 993–1001, Oct. 1990.

Park, Youngtae; "A Comparison Of Neural Net Classifiers and Linear Tree Classifiers: Their Similarities and Differences," Pattern Recognition, vol. 27, No. 11, pp. 1494–1503, (1994).

Tao, Eric Y. and Sklansky, Jack; "Analysis of Mammograms Aided By Database of Images of Calcifications and Textures," Proceedings of 1996 SPIE Conference on Medical Imaging–Computer Aided Diagnosis, SPIE vol. 2710, pp. 988–995, (1996).

Lofy, B. et al.; "Landmark Enhancement By Spoke Directed Anisotropic Diffusion," Proceedings of the IAPR Workshop on Methods for Extracting and Mapping Buildings, Roads, and other Man–Made Structures from Images, Technical University, pp. 1–15, Graz, Austria, Sep, 1996.

Zuckerman, H.C.; "The Role of Mammography In The Diagnosis of Breast Cancer," Breast Cancer, Diagnosis and Treatment, eds. I.M. Ariel and J.B.Cleary, Chapter 12, pp. 152–172, McGraw–Hill, New York, (1987).

Kohonen, T.; "Self–Organization and Associative Memory," pp. 24, pp. 119 thru 157, Second Edition, Springer–Verlag, Berlin, (1988).

* cited by examiner

VISUAL NEURAL CLASSIFIER

CROSS-REFERENCE TO RELATED APPLICATIONS

This application claims priority from U.S. provisional application Serial No. 60/078,771 filed on Mar. 19,1998.

STATEMENT REGARDING FEDERALLY SPONSORED RESEARCH OR DEVELOPMENT

This invention was made with Government support under Grant No. IRI-9123720, awarded by the National Science Foundation and Grant No. N00014-95-1-1298, awarded by Office of Naval Research. The Government has certain rights in this invention.

REFERENCE TO A MICROFICHE APPENDIX

Not Applicable

INCORPORATION BY REFERENCE

The following publications which are referenced herein using numbers in square brackets (e.g., [1]) are incorporated herein by reference:

[1] R. A. Jacobs and M. I. Jordan, "Adaptive Mixtures of Local Experts," *Neural Computation* 3, pp. 79–87, 1991.
[2] D. DeMers and G. Cotrell, "Non-Linear Dimensionality Reduction," *Advances in Neural Information Processing Systems*, pp. 580–587, 1993.
[3] G. Cybenko, "Approximation by Superpositions of a Sigmodal Function," *Mathematics of Control, Signals, and Systems*, Vol. 2, pp. 303–314, 1989.
[4] J. Mao and A. K. Jain, "Artificial Neural Networks for Feature Extraction and Multivariate Data Projection," *IEEE Transactions on Neural Networks*, Vol. 6, No. 2, March 1995.
[5] J. Sklansky and L. Michelotti, "Locally Trained Piecewise Linear Classifiers," *IEEE Transactions on Pattern Analysis and Machine* Intelligence, Vol. 6, No. 2, pp. 195–222, 1989.
[6] R. Caruana, "Learning Many Related Tasks at the Same Time," *Advances in Neural Information Processing Systems* 7, pp. 657–664, 1995.
[7] L. K. Hansen and P. Salamon, "Neural Network Ensembles," *IEEE Transactions on Pattern Analysis and Machine Intelligence*, Vol. 12, No. 10, pp. 993–1001, October 1990.
[8] Y. Park, "A Comparison of Neural Net Classifiers and Linear Tree Classifiers: Their Similarities and Differences," *Pattern Recognition*, Vol. 27, No. 11, pp. 1494–1503, 1994.
[9] T. Kohonen, *Self-Organization and Associative Memory*, Second Edition, Springer-Verlag, Berlin, 1988.
[10] E. Y. Tao and J. Sklansky, "Analysis of Mammograms Aided by Database of Images of Calcifications and Textures," Proc. of 1996 SPIE Conf. on Medical Imaging—Computer-Aided Diagnosis, February 1996.
[11] B. Lofy, O. Pätz, M. Vriesenga, J. Bernarding, K. Haarbeck, J. Sklansky, "Landmark Enhancement for Spoke-Directed Anisotropic Diffusion," Proc. of the IAPR Workshop on Methods for Extracting and Mapping Buildings, Roads, and other Man-Made Structures from Images, Technical University, Graz, Austria, September 1996.
[12] H. C. Zuckerman, "The Role of Mammography in the Diagnosis of Breast Cancer," in *Breast Cancer, Diagnosis, and Treatment*, eds. I. M. Ariel and J. B. Cleary, Chap. 12, McGraw-Hill, N.Y. pp. 152–172, 1987.
[13] A. P. M. Forrest and R. J. Aitken, "Mammography Screening for Breast Cancer," *Ann. Rev. Medicine* 41, pp. 117–132, 1990.
[14] M. Vriesenga and J. Sklansky, "Genetic Selection and Neural Modeling of Piecewise-Linear Classifiers," *International Journal of Pattern Recognition and Artificial Intelligence*, Vol. 10, No. 5, pp. 587–612, 1996.

BACKGROUND OF THE INVENTION

1. Field of the Invention

This invention pertains generally to classifiers constructed in the form of neural networks, and more particularly to neural classifiers that can map design data and decision curves on the same two-dimensional display.

2. Description of the Background Art

The applications to which neural networks can be applied continues to expand. Examples include medical analysis, character recognition, speech recognition, remote sensing, and geophysical prospecting among others.

An example of the use of neural networks for medical analysis can be found in U.S. Pat. No. 5,872,861 issued to Makram-Elbeid on Feb. 16, 1999, which is incorporated by reference herein. That patent describes a method for processing digital angiographic images for automatic detection of stenoses in blood vessels using a neural network. The digital image is processed in order to determine the central points and the edge points of the objects represented, provided that these objects constitute sufficiently uniform, contrasting masses on a sufficiently uniform background. The neural network with a hidden layer and two outputs is used to determine the probability that a potential stenosis is real or concerns a false alarm. The input of the neural network receives a vector whose components are characteristic traits of a candidate stenosis detected by means of the above method. The vector may be formed, for example by the intensities of the pixels of the icon of the candidate stenosis. The two outputs of the neural network encode the class of the non-stenoses (output 1) and that of the stenoses (output 2), respectively. Once reduced to the interval (0,1) by a mathematical transformation, the two activations of the output of the network can be interpreted as probabilities of association with either the class 1 or the class 2, given the vector of characteristic traits (probabilities a posterior). The two probabilities are stored for each of the candidate stenoses. This enables the operator himself to define the degree of reliability, on a scale of probability, so as to retain or reject a candidate stenosis. The storage of the probabilities enables the user to try out several reliability levels without having to repeat the entire procedure for the detection and recognition of stenoses as described above. A graphic display method visualizes the stenosis retained in each of the individual images.

An example of neural networks applied to character recognition can be found in U.S. Pat. No. 5,859,925 issued to Yaeger et al. on Jan. 12, 1999, which is also incorporated herein by reference. As explained by Yaeger et al., various classification algorithms are available based on different theories and methodologies used in the particular area. In applying a classifier to a specific problem, varying degrees of success with any one of the classifiers have been obtained and, to improve the accuracy and success of the classification results, different techniques for combining classifiers have been studied. Nevertheless, problems of obtaining a high classification accuracy within a reasonable amount of time exist for the present classifying combination techniques and an optimal integration of different types of information is therefore desired to achieve high success and efficiency. Accordingly, combinations of multiple classifiers have been employed. However, none of the conventional approaches achieve the desired accuracy and efficiency in obtaining the combined classification result. The solution provided by Yaeger et al. is a classifying system having a single neural network in which multiple representations of a character are provided as input data. The classifying system analyzes the input representations through appropriate combination of their corresponding sets of data in the neural network architecture.

Another way to enhance classification performance is to use multi-expert neural classifiers [1]. This can result in computational complexity, so attempts have been made to use networks with two-neuron hidden layers. The prevailing view, however, is that networks with only two-neuron hidden layers do not have the capacity to perform large scale classification tasks and can only be used for exploratory data analysis [4] or data compression [2]. Therefore, there is a need for a classifier for networks with two-neuron hidden layers that combines information provided by several classification tasks into a visually meaningful and explanatory display, and that can display a large database of cases or objects.

BRIEF SUMMARY OF THE INVENTION

The present invention satisfies the foregoing needs by providing a neural classifier that combines information provided by several classification tasks into a visually meaningful and explanatory display. We refer to this as a "visual neural classifier." Using the invention a designer can identify difficult-to-classify input patterns that may then be applied to an additional classification stage.

A visual neural classifier according to the invention comprises two major elements: (a) a set of experts and (b) a visualization network. Visualization is accomplished by a funnel-shaped multilayer dimensionality reduction network [2]. The dimensionality reduction network is configured to learn one or more classification tasks. If a single dimensionality reduction network does not provide sufficiently accurate classification results, a group of these dimensionality reduction networks may be arranged in a modular architecture [1]. Among these dimensionality reduction networks, we refer to those receiving the input data as experts. We refer to the dimensionality reduction network that combines the decisions of the experts to form the final classification decision a visualization network.

Each expert comprises a multilayer neural network that reduces the multidimensional feature space through successive layers to a two-neuron layer for visualization. Each dimensionality reduction network contains a two-neuron layer that displays the training data and the decision boundaries in a two-dimensional space. This architecture facilitates (a) interactive design of the decision function and (b) explanation of the relevance of various training data to the classification decisions. By combining the use of use of experts with the visualization network as described, the visual neural classifier of the present invention provides both excellent classification accuracy and good visual explanatory power.

For each classification task a distinct neural network is connected to the two-neuron layer. Each of these networks expands to a layer containing a number of neurons equal to the number of classes. The classifier can display a large database of cases or objects on a "relational map." Each object can be represented on the relational map as a colored point, such as black, gray or red. The color discriminates the class or subclass to which the point belongs. The network can also produce one or more decision curves that partition the relational map into decision regions, each decision region associated with an assignment of points to a unique class. Furthermore, the classifier can be trained to produce a relational map in which identically colored points form clusters. Also, the location of the points on the relational map provides an indication of decision difficulty. Points that are close to a decision curve are difficult to classify, and those that are far from all decision curves are easy to classify.

The relational map allows a user to browse a large database of objects, and quickly retrieve similar objects. It also provides decision support to a user. A user can observe the decision associated with a particular object and observe the decision uncertainty associated with the distance of the object from the nearest decision curve on the relational map. The user can then integrate this information with information retrieved from related objects to produce an enhanced decision. In addition, the relational maps provide a powerful means for interactive design of the classifier.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is described with reference to FIG. 1 through FIG. 8. It will be appreciated that the architecture of the invention may vary as to configuration and as to details thereof, and that the method may vary as to the specific steps and sequence, without departing from the basic concepts as disclosed herein.

1. Architecture

A visual neural classifier according to the present invention comprises two major elements: (a) a set of experts and (b) a visualization network.

In the present invention, each expert comprises a multi-layer neural network that reduces the multidimensional feature space through successive layers to a two-neuron layer for visualization. For each classification task, a distinct neural network is connected to the two-neuron layer. Each of these networks expands to a layer containing a number of neurons equal to the number of classes.

Figure 1:
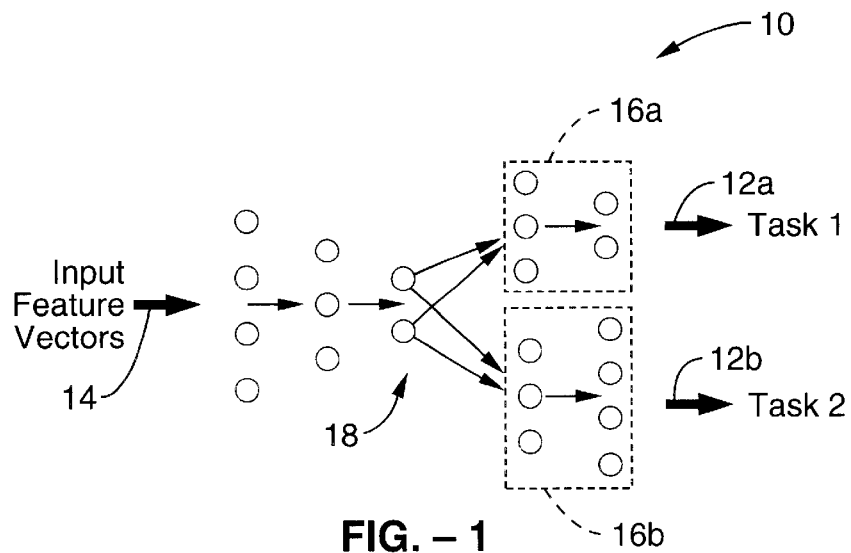
FIG. 1 is a schematic diagram of an expert with a two-neuron layer according to the invention.

For example, FIG. 1 shows an expert 10 designed to learn two tasks 12a, 12b from a set of input feature vectors 14. For each classification task 12a, 12b, a distinct neural network 16a, 16b, respectively, is connected to the two-neuron layer 18. Each neural network 16a, 16b processes the mapped data from the neck through two more layers. Each of the neurons in the final layer corresponds to a unique class. Note the approximate funnel-shaped architecture of this neural network.

Figure 2:
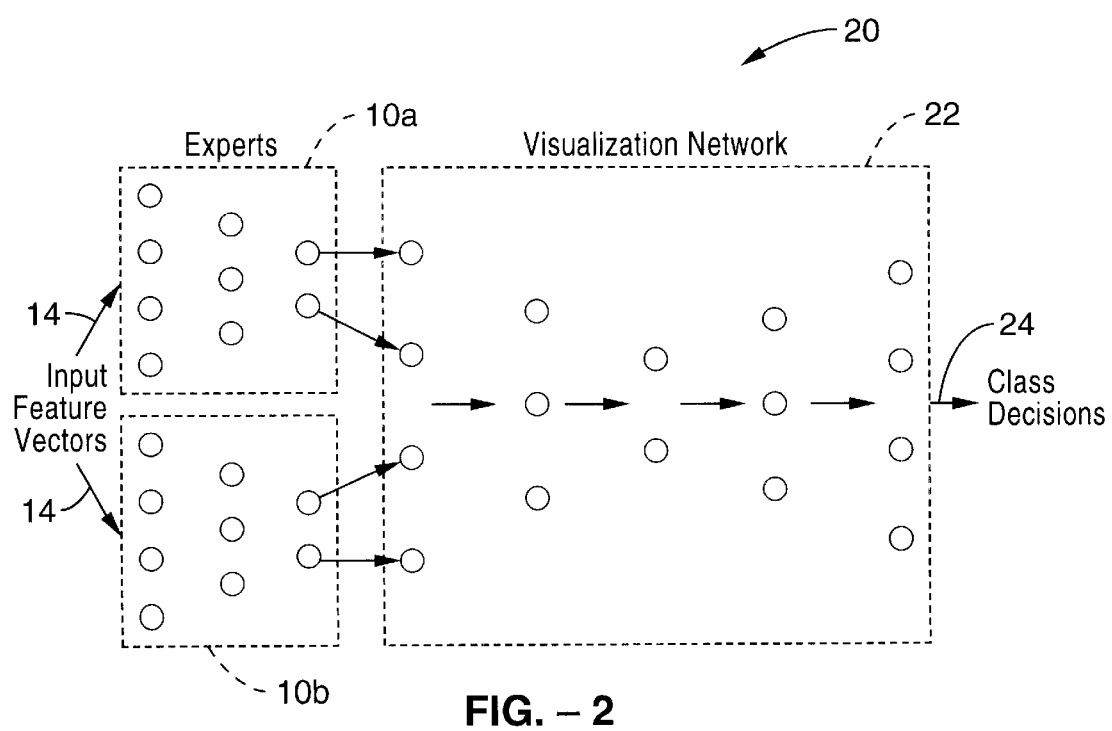
FIG. 2 is a schematic diagram of an embodiment of the architecture of a visual neural classifier according to the invention.

Referring also to FIG. 2, the neck of the funnel shown in FIG. 1 provides a two-dimensional relational map for visualizing the data. The visualization network combines the visualization data from the necks of multiple experts to form the relational map. Note that the visualization network is also funnel-shaped as can be seen in FIG. 2, which shows a classifier 20 comprising two experts 10a, 10b connected to a visualization network 22 to provide class decisions 24.

2. Classifier Design

Figure 3:
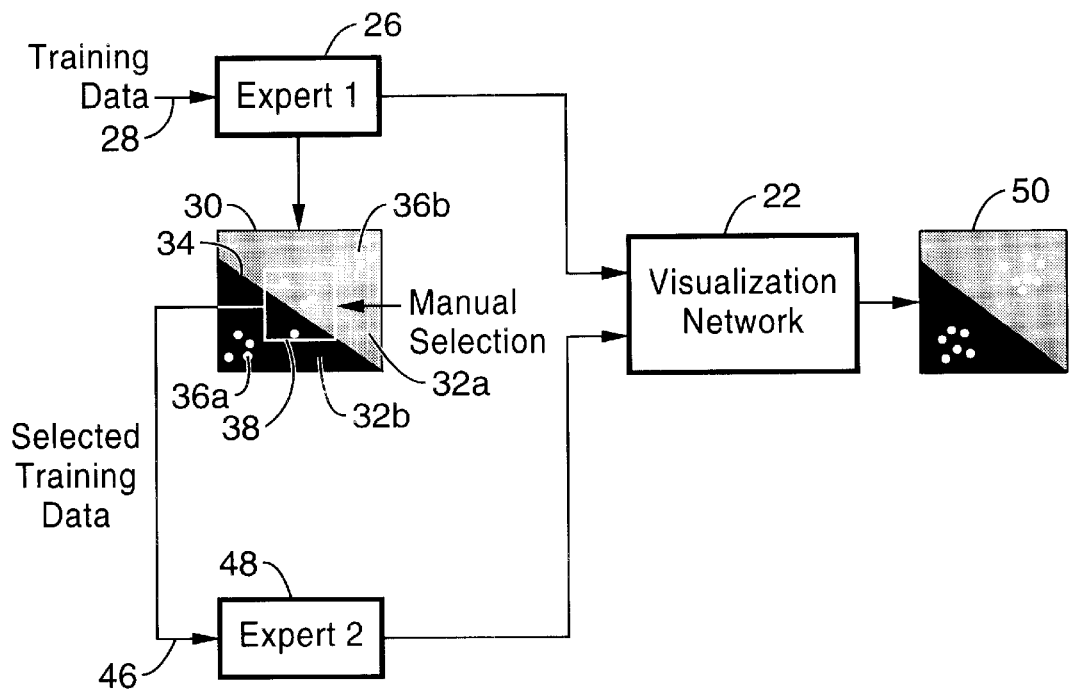
FIG. 3 schematically shows the design of a visual neural classifier and display of an improved relational map according to the invention.
Figure 4:
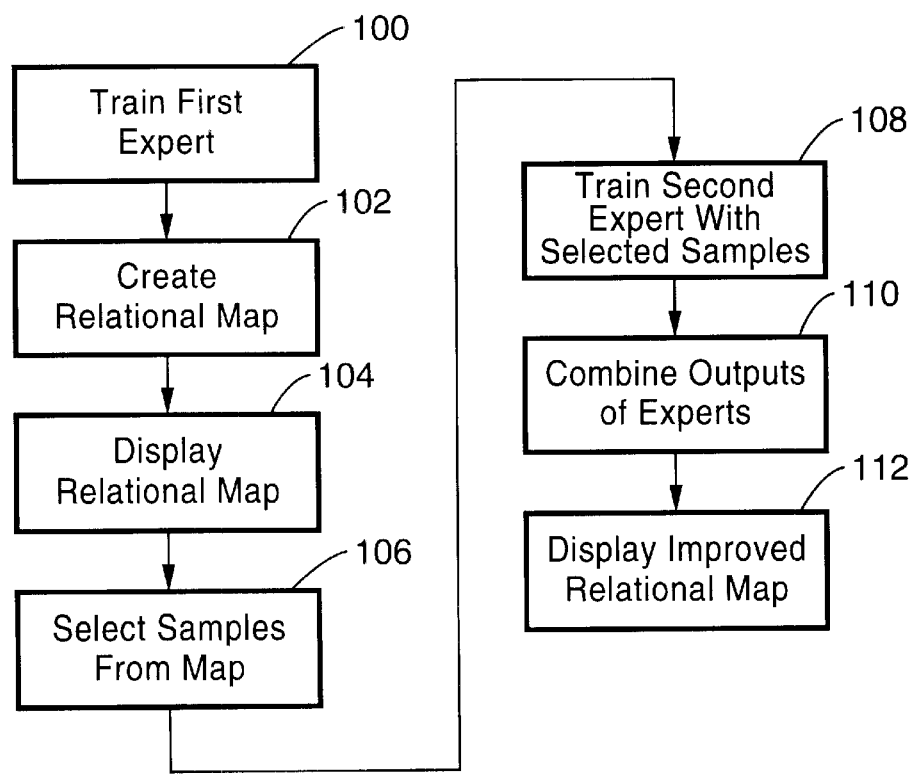
FIG. 4 is a flow diagram showing design steps corresponding to the schematic diagram shown in FIG. 3 according to the invention.

The design of a visual neural classifier according to the invention involves the following steps. Referring to FIG. 3 and FIG. 4, the first step 100 is to train an individual neural network such as "Expert 1" 26 using the entire training set 28. The number of neurons in the first hidden layer may be determined by designing a piecewise linear classifier to classify the data [5]. Each hyperplane may then be implemented by a formal neuron containing a sigmoidal activation function [14]. The number of neurons in the second hidden layer is two, as indicated in FIG. 1.

All of the experts and the visualization network have the same funnel-shaped architecture. The weights feeding the neurons preceding and inside the neck of each of these component networks are selected by the same procedure. In this procedure, the weights are selected so as to maximize the mutual information $I(x, C_j)$ of (a) the set of mapped points x associated with the component network and (b) the set of classes $C_j$ associated with the jth task, repeated for each j. This mutual information is computed by the formula $$I(x, C_j) = H(x) - H(x|C_j),$$

where $H(x)$ is the entropy of the array of mapped points, and $H(x|C_j)$ is the entropy of the array of mapped points conditioned on the set of classes $C_j$. The remaining layers of the visual neural classifier are trained by traditional forms of gradient descent (e.g., backpropagation).

After this first expert is trained, its relational map 30 is created at step 102 and displayed at step 104. As can be seen, relational map 30 has two distinct regions 32a, 32b separated by a class boundary 34. Each region shows a cluster of training samples 36a, 36b, respectively. Also shown is an area 38 containing misclassified training samples or samples close to class boundary 34.

Figure 5:
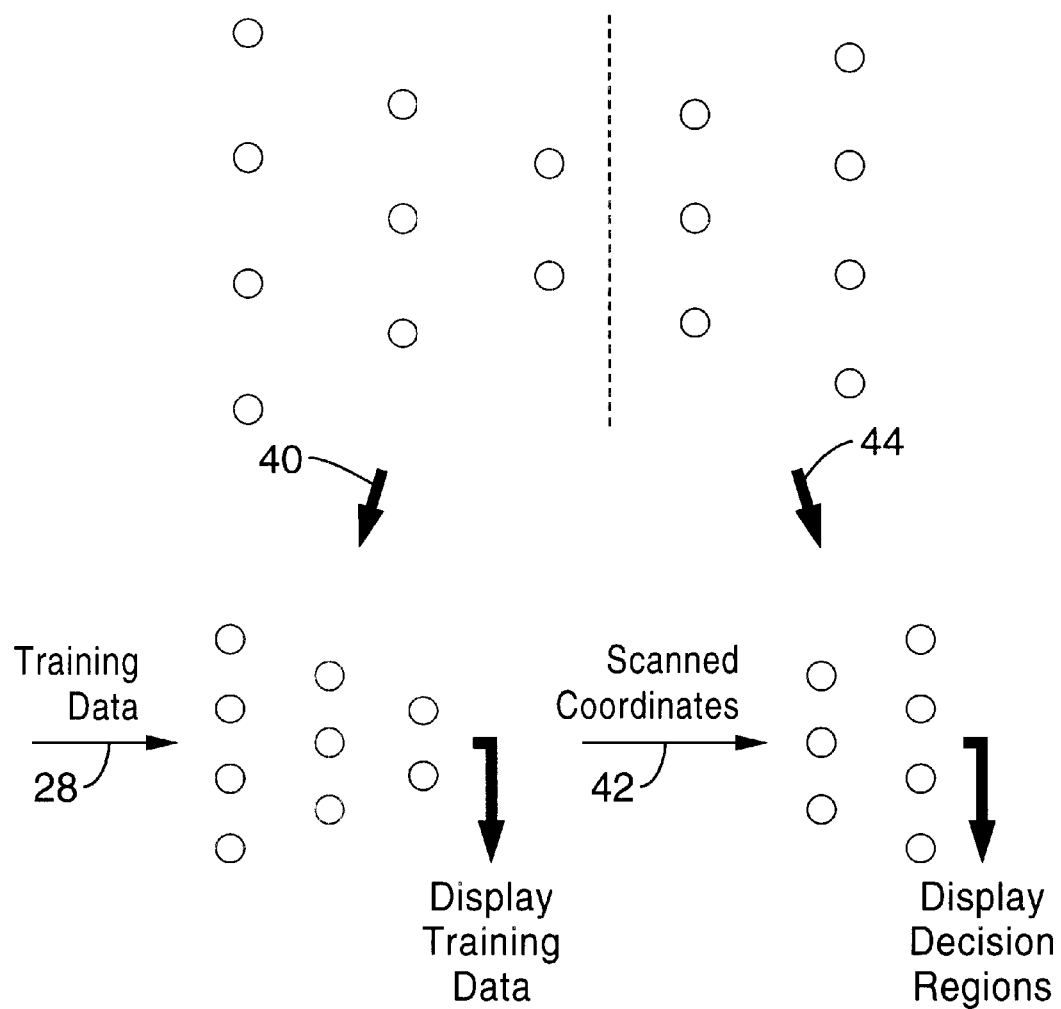
FIG. 5 schematically shows the formation of the relational map for Expert 1 in FIG. 3 according to the invention.

Referring also to FIG. 5, relational map 30 is created by presenting the training samples 28 to the network and using the outputs 40 of the two-neuron layer as the coordinates of the relational map. The decision regions are created by scanning a complete set of map coordinates 42 into the portion 44 of the local expert following the two-neuron layer. In the last layer, the neuron with the largest response determines the class associated with each scanned coordinate.

Next, at step 106 the designer manually selects area 38 of the map 30 containing misclassified training samples or samples close to a class boundary. At step 108, the training samples 46 in the selected area are presented to a second expert 48 which learns to classify the selected subset of training samples. Finally, at step 110 the visualization network 22 combines the outputs of the necks of the experts as shown in FIG. 2. Training the visualization network provides an improved relational map 50 of the training data and the decision regions which is displayed at step 112.

3. Approximation Theorem for Two-Neuron Hidden Layers

The visual neural classifier of the present invention uses dimensionality reduction networks with two-neuron hidden layers. The theorem below shows that this type of network can approximate an arbitrarily complex decision function to any desired precision. This result runs counter to the prevailing view that networks with two-neuron hidden layers do not have the capacity to perform large scale classification tasks and can only be used for exploratory data analysis [4] or data compression [2].

Theorem. Every vector-valued decision function f(x) can be constructed to any required precision in the form of a five-layer neural network F, with the first layer consisting of the inputs, the third layer consisting of two neurons, and the fifth layer producing the final classifications.

Proof: Let k denote the dimensionality of the range of f(x). Let h(x) denote the two-dimensional vector-valued mapping from the input x to the third layer. Using the vector-valued extension of Cybenko's universal approximation theorem [5], h(x) can approximate a decision function that retains the discriminability of the classes $\{C_i\}$ of the input data. Now let h(x) be the input to the last two layers of F. Let the number of neurons in the fifth layer be k. Let g(x) denote the k-dimensional vector-valued output of the fifth layer of F. Since h(x) retains, to any desired precision, the discriminability of the classes, g(x) can retain the discriminability of the classes to any specified precision that is less than that for h(x). Hence g(x) can approximate f(x) to any specified precision. QED A corollary of this theorem is that a network of more than five layers can also be used to approximate f(x), provided that the network contains a two-neuron layer and that this layer is not adjacent to either the input layer or the output layer.

4. Classifier Properties

A visual neural classifier as described herein can perform several classification tasks simultaneously and provide the user with explanatory information. The visual neural classifier uses a flexible architecture and training method to provide good classification performance. This flexibility allows the designer to adapt the visual neural is classifier to a wide variety of applications.

Classification explanations are derived from visualization of the training set and decision regions. The decision regions are separated by decision curves. A user can compare the features associated with a classifier query with the features of nearby points on the display. These points represent a database of examples. The user can browse this database to find examples that are similar to the query. These examples can provide classification confirmation or an understanding of a classifier decision. The user then can use this information to make a decision.

The visual neural classifier handles multiple classification tasks by appending independent neural networks to the two-neuron hidden layer of the dimensionality reduction networks. The sharing of an internal hidden layer, in this case the two-neuron layer, improves the generalization performance of all learned tasks as compared to using separate networks for each task [6]. In the visual neural classifier, tasks share a common representation at the two-neuron layer. Since the two-neuron layer is shared, the visual map is constrained to contain information about all the tasks. For example, in medical radiology, one of the tasks might be to determine whether or not the observed images indicate the existence of a malignant lesion. Another task might be to classify the image according to the type of lesion, e.g. circumscribed mass, stellate legion, or cluster of calcifications. In this case a relational map will be created so points on the map near the mapped query will represent lesions that are diagnostically as well as visually similar.

The design flexibility of the visual neural classifier is based on visualization of the training data and decision regions. In many modular neural network applications, the individual modules are trained on the entire training set leading to a neural network ensemble [7]. In other cases, each module is trained on an independent subset of the training set leading to a mixture of local experts. For a given problem it is not obvious which method of partitioning the training set should be used. In the visual neural classifier, the designer can view the clustering of the data and create a partition of the training set tailored to the problem at hand. If there is no obvious clustering, the designer has the option of selecting all the training points for each neural network module in which case a standard neural network ensemble will be created. If the data forms well-separated clusters, each cluster can be presented to an individual module leading to a mixture of local experts. In general, visualization will create overlapping subsets of the training set leading to a modular network somewhere between an ensemble and a mixture of local experts.

EXAMPLE 1

Figure 6:
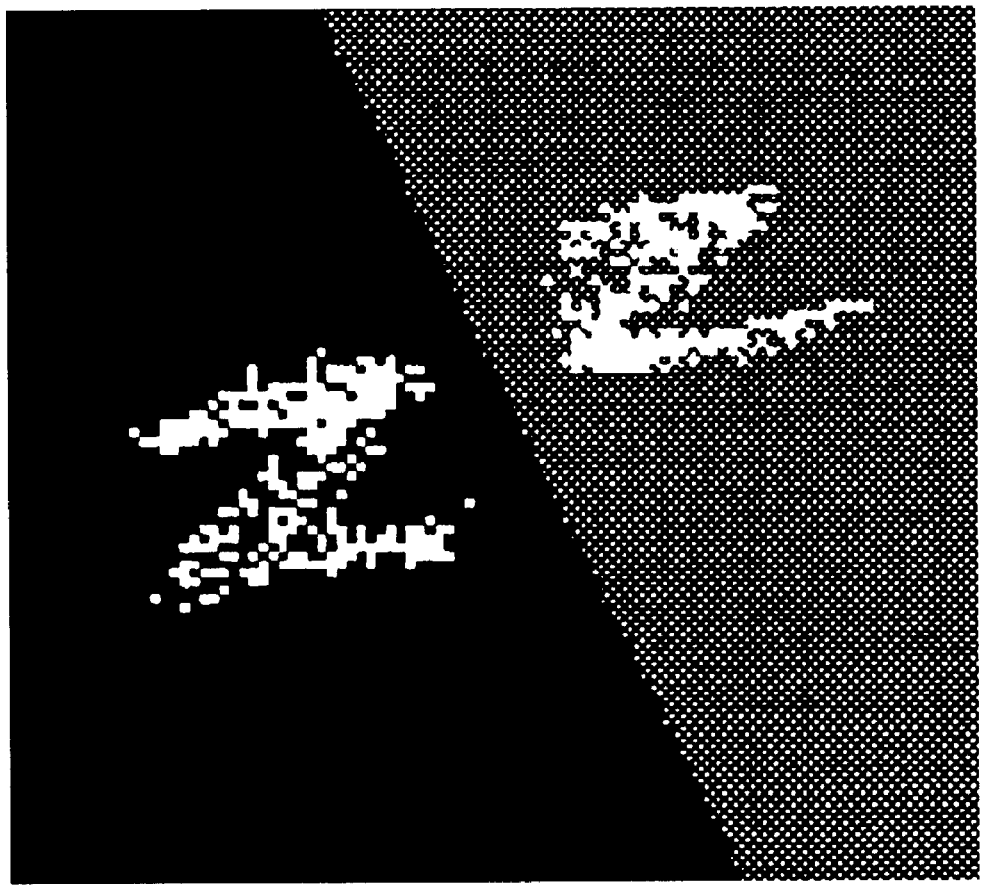
FIG. 6 illustrates a one-task relational map of a pair of linked tori.

To illustrate the properties of a dimensionality reduction network we constructed two-class data distributed in the form of a pair of linked tori, as described in [5]. Each class contains 500 3-dimensional feature vectors randomly drawn from the interior of a torus. The two tori are linked, making it impossible to map the data into a two-dimensional space without destroying its topology. FIG. 6 shows the result of applying the visual neural classifier to this data set. Here the task of the classifier was to associate each input vector with one of two tori. In designing this network the number of neurons in the first hidden layer was selected to match the number of hyperplanes from a piecewise linear classifier [8]. The white dots in FIG. 6 represent training data, while the black and gray areas correspond to the two decision regions.

Figure 7:
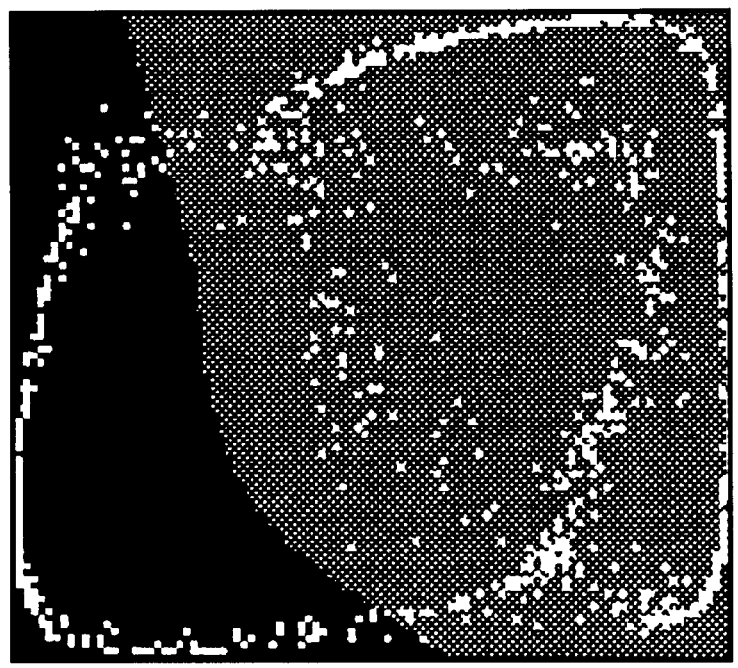
FIG. 7 illustrates a two-task relational map of a pair of linked tori.

To obtain the map in FIG. 7, a second task was added. The purpose of the second task was to preserve the distance relationships among the points of the tori. For this classification task, we clustered the data into ten clusters using the fuzzy c-means clustering algorithm. The cluster memberships of the data were used as training targets for the visual neural classifier.

Figure 8:
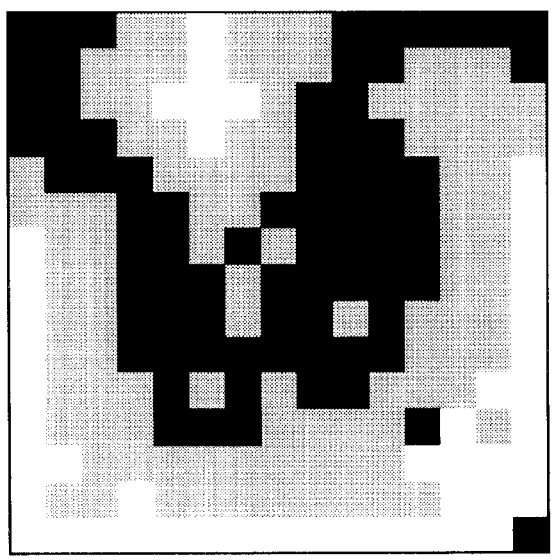
FIG. 8 illustrates a 15×15 self-organizing map of a pair of linked tori.

We also used the data to train a 15×15 self-organizing map, which is a type of neural network often used to visualize multidimensional data [9]. FIG. 8 shows the resulting 15×15 self-organizing map. Here, the white pixels correspond to one torus, the black pixels correspond to the other torus, and the gray pixels represent neurons in the 15×15 map that do not respond to any of the training samples.

In FIG. 6, the two classes are compactly represented and well separated by the visual neural classifier, but it is not possible to infer the original linked structure of the data. When the second task is added, the topology becomes more apparent. Topology preservation occurs at the expense of some classification accuracy in assigning points to the correct torus. This occurs because of the conflicting nature of the two tasks. The self-organizing map preserves the shapes of the class regions and their linked structure better than the visual neural classifier trained on one task, but not as well as the visual neural classifier trained on both tasks.

As can be seen from the foregoing, neural networks have previously been used for exploratory data analysis [2, 4]. In addition, multi-expert neural classifiers have been shown to enhance classification performance [1]. By taking advantage of both concepts, a visual neural classifier constructed in accordance with the present invention provides both excellent classification accuracy and good visual explanatory power. In addition, the two-dimensional relational maps provide a powerful means for interactive design of the classifier.

Because of the superior classification accuracy of the present invention, there are a number of applications to which it can be applied. For example, the relational map that is produced can be used to search large databases for related objects. The relational map can also be used for database-aided decision support. Finally, the classifier can be used to perform data mining tasks such as data visualization, discovery of object relationships and patterns, classification, and prediction. Potential applications include computer-aided diagnosis, such as radiologist decision support and classification; decision support and data mining for financial market prediction and portfolio management; decision support for inspection of electronic circuits; database searching and decision support for face recognition; database searching and decision support for internet searching; database searching and decision support for fingerprint identification; database searching and decision support for DNA identification; database searching and decision support for voice recognition; database searching and data mining for text searching; database searching for patent searches; database searching and decision support for landmark identification; and data mining for discovery and identification of new stars, planets and other celestial objects.

Although the description above contains many specifics, these should not be construed as limiting the scope of the invention but as merely providing illustrations of some of the presently preferred embodiments of this invention. Thus the scope of this invention should be determined by the appended claims and their legal equivalents.

What is claimed is:

1. A visual neural classifier, comprising:

(a) a neural expert, wherein said expert receives input data having multidimensional features and reduces said multidimensional features through successive layers to a two-neuron decision layer for visualization; and (b) a visualization network, wherein said visualization network combines decisions from said two-neuron layer to form a final classification decision.

2. A visual neural classifier as recited in claim 1, wherein said neural expert comprises a multilayer neural network.

3. A visual neural classifier as recited in claim 1, wherein said visualization network comprises a two-neuron layer that displays training data and decision boundaries in a two-dimensional space.

4. A visual neural classifier as recited in claim 1, wherein said visualization network comprises a dimensionality reduction network configured to learn one or more classification tasks from training data.

5. A visual neural classifier as recited in claim 4, further comprising a distinct neural network connected to said two-neuron layer for each said classfication task.

6. A visual neural classifier as recited in claim 5, wherein each said neural network expands to a layer containing a number of neurons equal to the number of classes.

7. A visual neural classifier, comprising:
   (a) a plurality of multilayer neural networks, wherein each said neural network receives input data having multidimensional features and reduces said multidimensional features through successive layers to a two-neuron decision layer for visualization; and
   (b) a visualization network, wherein said visualization network combines decisions from said two-neuron layers to form a final classification decision.

8. A visual neural classifier as recited in claim 7, wherein said visualization network comprises a two-neuron layer that displays training data and decision boundaries in a two-dimensional space.

9. A visual neural classifier as recited in claim 7, wherein said visualization network comprises a dimensionality reduction network configured to learn one or more classification tasks from training data.

10. A visual neural classifier as recited in claim 9, further comprising a distinct neural network connected to said two-neuron layer for each said classification task.

11. A visual neural classifier as recited in claim 10, wherein the final layer of each said neural network contains a number of neurons equal to the number of classes.

12. A visual neural classifier, comprising:
   (a) a multilayer neural network, wherein said neural network receives input data having multidimensional features and reduces said multidimensional features through successive layers to a two-neuron decision layer for visualization; and
   (b) a visualization network, wherein said visualization network combines decisions from said two-neuron layer to form a final classification decision, and wherein said visualization network displays training data and decision boundaries in a two-dimensional space.

13. A visual neural classifier as recited in claim 12, wherein said visualization network comprises a dimensionality reduction network configured to learn one or more classification tasks from said training data.

14. A visual neural classifier as recited in claim 13, further comprising a distinct neural network connected to said two-neuron layer for each said classification task.

15. A visual neural classifier as recited in claim 14, wherein the final layer of each said neural network contains a number of neurons equal to the number of classes.

16. A visual neural classifier, comprising:
   (a) a neural expert configured to receive input data having multidimensional features and reduce said multidimensional features through successive layers to a two-neuron decision layer for visualization; and
   (b) a visualization network configured to combine decisions from said two-neuron layer to form a final classification decision.

17. A visual neural classifier as recited in claim 16, wherein said neural expert comprises a multilayer neural network.

18. A visual neural classifier as recited in claim 16, wherein said visualization network comprises a two-neuron layer that displays training data and decision boundaries in a two-dimensional space.

19. A visual neural classifier as recited in claim 16, wherein said visualization network comprises a dimensionality reduction network configured to learn one or more classification tasks from training data.

20. A visual neural classifier as recited in claim 19, further comprising a distinct neural network connected to said two-neuron layer for each said classification task.

21. A visual neural classifier as recited in claim 20, wherein each said neural network expands to a layer containing a number of neurons equal to the number of classes.

22. A visual neural classifier, comprising:
   (a) a plurality of neural experts;
   (b) each said expert configured to receive input data having multidimensional features and reduce said multidimensional features through successive layers to a two-neuron decision layer for visualization; and
   (c) a visualization network configured to combine decisions from said two-neuron layers to form a final classification decision.

23. A visual neural classifier as recited in claim 22, wherein each said neural expert comprises a multilayer neural network.

24. A visual neural classifier as recited in claim 22, wherein said visualization network comprises a two-neuron layer that displays training data and decision boundaries in a two-dimensional space.

25. A visual neural classifier as recited in claim 22, wherein said visualization network comprises a dimensionality reduction network configured to learn one or more classification tasks from training data.

26. A visual neural classifier as recited in claim 25, further comprising a distinct neural network connected to said two-neuron layer for each said classification task.

27. A visual neural classifier as recited in claim 26, wherein each said neural network expands to a layer containing a number of neurons equal to the number of classes.

* * * * *